Nov. 19, 1968  W. E. SARGENT  3,411,738
AIRFOIL TIP
Original Filed Oct. 19, 1964  2 Sheets-Sheet 1
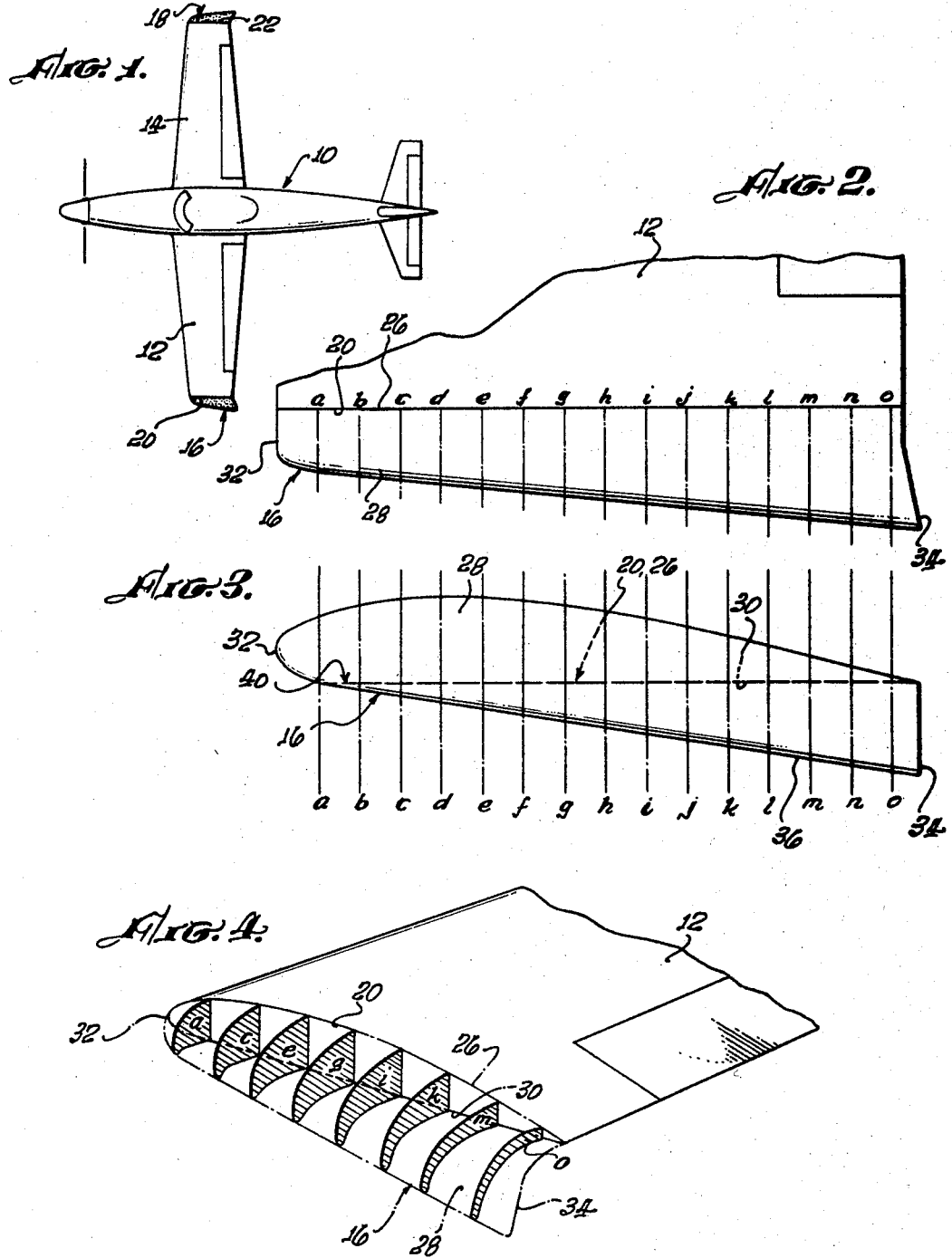
INVENTOR.
WILLIAM E. SARGENT,
By His Attorneys
HARRIS, KIECH, RUSSELL & KERN.

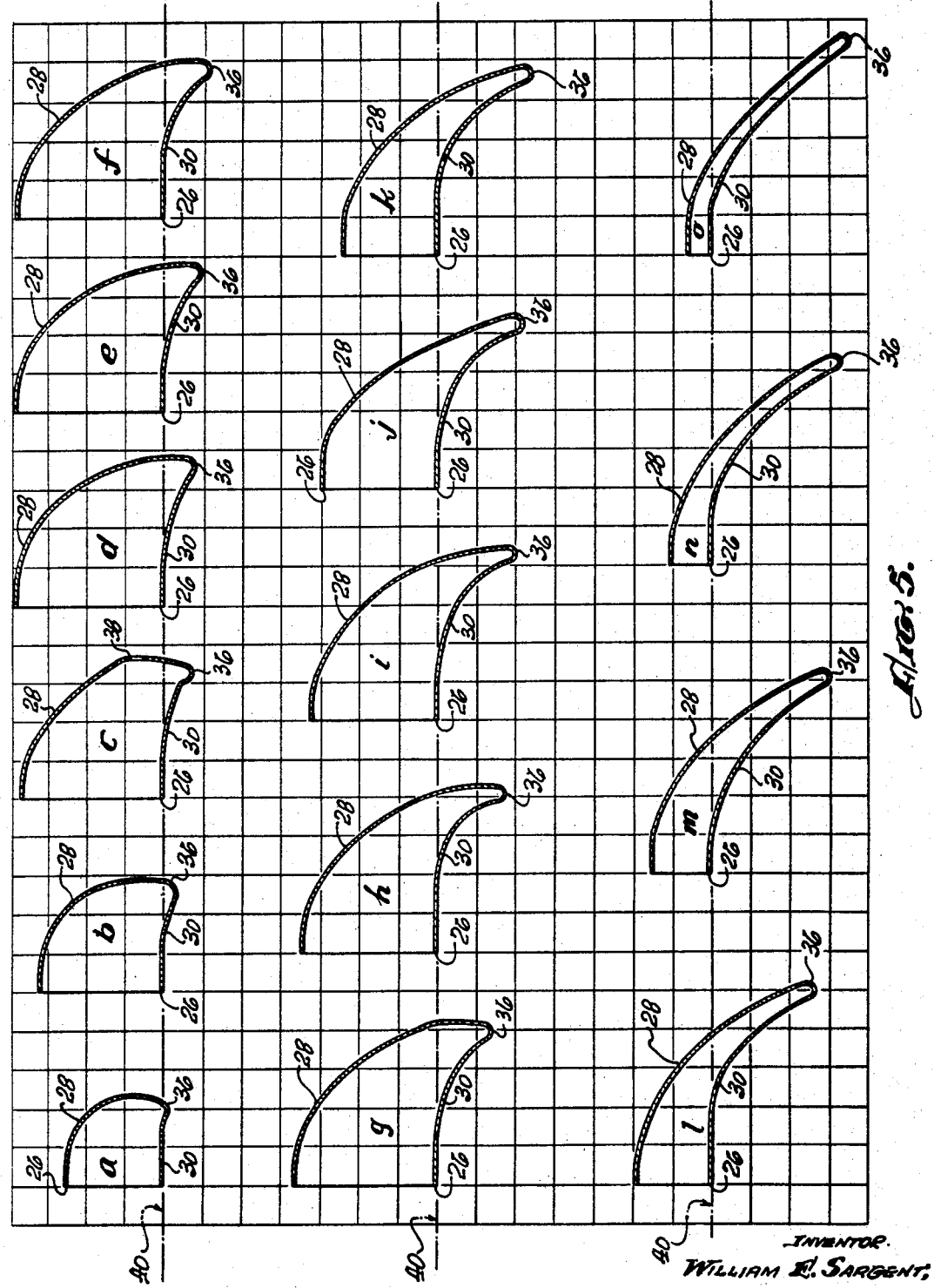

United States Patent Office 3,411,738
Patented Nov. 19, 1968

3,411,738
AIRFOIL TIP
William E. Sargent, P.O. Box 711,
Blythe, Calif. 92225
Continuation of application Ser. No. 404,777, Oct. 19, 1964. This application Oct. 27, 1966, Ser. No. 590,091
2 Claims. (Cl. 244—40)

ABSTRACT OF THE DISCLOSURE

An airplane wing tip which acts as an end plate on the tip of the wing. The tip has an outboard end which diverges rearwardly, relative to its inboard end, from the leading edge of the tip to its trailing edge, and which is inclined downwardly, relative to its inboard end, from the leading edge of the tip to its trailing edge. The outboard end of the tip, at the leading edge thereof, is located at substantially the same level as the lower surface of the inboard end of the tip, and the outboard end of the tip, at the trailing edge thereof, is located below the inboard end thereof a distance substantially equal to the maximum thickness of the inboard end of the tip. The tip curves and converges generally outwardly and downwardly from its inboard end to its outboard end, and the degree of such outward and downward convergence increases progressively from the leading edge of the tip to its trailing edge.

Cross reference to related application

This application is a continuation of my application Ser. No. 404,777, filed Oct. 19, 1964, and now abandoned.

Background of invention

The present invention relates in general to airfoils and, more particularly, to an airfoil tip capable of modifying favorably various characteristics of the airfoil on which it is mounted.

Since the invention has been successfully embodied in an airplane wing tip, it will be considered in such connection herein as a matter of convenience. However, it will be understood that the invention is not limited to airplane wing tips, but may be incorporated in tips for other airfoils, such as helicopter blades, airplane propellers, and the like.

Summary and objects of invention

A primary object of the invention is to provide an airplane wing tip which increases the lift of the wing and decreases its induced drag.

More particularly, the primary object of the invention is to provide an airplane wing tip which reduces the size of the usual trailing vortex formed behind the tip of the wing, thereby increasing the lift of the wing and reducing its induced drag.

Another and important object of the invention is to provide an airplane wing tip which, in addition to reducing the size of the trailing vortex, directs such vortex downwardly.

The foregoing aerodynamic effects of the wing tip of the invention alter the performance characteristics of the airplane favorably in various respects. For example, all else being equal, the invention reduces the distance required for take off, reduces the landing speeding of the airplane (and thus its landing run), increases the rate of climb and the cruising speed of the airplane, improves stability, eliminates false stall warnings (such as shuddering in turns), and the like. Expressed differently, the invention permits carrying more payload without reducing the performance characteristics of the airplane.

Merely by the way of example, comparative flight tests conducted on a Piper PA-25 airplane with and without the wing tips of the present invention showed that such wing tips reduce the take off run by approximately fifty percent, reduce the landing speed of the airplane by about twenty percent, and increase its cruising speed by approximately five percent. As will be understood, the comparative tests were conducted under identical conditions of weight, power, and the like.

Another and extremely important advantage of the invention is that when it is applied to an airplane used for crop dusting, it results in much better control of the dust pattern. More particularly, since the invention results in wing tip vortices which are smaller than those produced by conventional wing tips, and which are directed downwardly, the dust is applied considerably more efficiently and uniformly, and with far less scattering. Reduction of dust scattering is important not only because it reduces the amount of dusting material required, but because it minimizes air pollution, and the possibility of damage to adjoining properties, by drifting dust.

The foregoing advantages and results may be achieved by providing, and an important object of the invention is to provide, an airplane wing tip which: includes an inboard end having a profile substantially conforming to the profile of the outboard end of the wing on which it is to be mounted; includes a substantially straight outboard end which diverges rearwardly, relative to its inboard end, from the leading edge of the tip to its trailing edge, and which is inclined downwardly, relative to its inboard end, from the leading edge of the tip to its trailing edge; curves outwardly and downwardly from its inboard end to its outboard end with the degree of such curvature increasing progressively from the leading edge of the tip to its trailing edge; and has a maximum span, measured in the direction of the span of the wing, which is small as compared to the chord length of the tip.

The foregoing objects, advantages, features and results of the present invention, together with various other objects, advantages, features and results thereof which will be evident to those skilled in aerodynamics in the light of this disclosure, may be achieved with the exemplary embodiment of the invention described in detail hereinafter and illustrated in the accompanying drawings.

Description of drawings

In the drawings:

FIG. 1 is a plan view of an airplane having left and right wings respectively equipped with left and right wing tips of the invention, the left and right wing tips being mirror images of each other and being symmetrical relative to the axis of the airplane;

FIG. 2 is an enlarged fragmentary plan view of the outboard end of the left wing and of the left wing tip thereon;

FIG. 3 is a side elevational view of the outboard end of the left wing and of the outboard end of the left wing tip thereon;

FIG. 4 is a fragmentary perspective view of the outboard end of the left wing and of the left wing tip showing semidiagrammatically the configuration of the left wing tip, FIG. 4 showing spanwise cross sections $a$, $c$, $e$, $g$, $i$, $k$, $m$ and $o$ through the left wing tip which are taken along the broken lines $a$, $c$, $e$, $g$, $i$, $k$, $m$ and $o$, respectively, of FIGS. 2 and 3 of the drawings;

FIGS. 5$a$ to 5$o$ are enlarged spanwise sectional views through the left wing tip respectively taken along the broken lines $a$ to $o$ of FIGS. 2 and 3, FIGS. 5$a$, 5$c$ 5$e$, 5$g$, 5$i$, 5$k$, 5$m$ and 5$o$ respectively corresponding to the spanwise cross sections $a$, $c$, $e$, $g$, $i$, $k$, $m$ and $o$ of FIG. 4 of the drawings.

*Description of exemplary embodiment of invention*

Referring initially to FIG. 1, illustrated therein is an airplane 10 having left and right wings 12 and 14 respectively equipped with left and right wing tips 16 and 18 of the invention.

The present invention is concerned primarily with the configurations of the wing tips 16 and 18, and with the effects of the wing tips on the aerodynamic characteristics of the airplane 10, the performance characteristics of the airplane, and the distribution of dust, or spray, discharged from the airplane when it is used for crop dusting or spraying, or other dusting or spraying operations. In other words, insofar as the present application is concerned, the wing tips 16 and 18 may be of any suitable construction, and they may be attached to the outboard ends 20 and 22 of the wings 12 and 14 in any suitable manner. In some instances, the wing tips 16 and 18 may merely replace existing tips. In others, it may be necessary to cut back and/or square off the outboard ends of existing wings. Of course, in new airplanes, the wing tips 16 and 18 may be incorporated as integral parts of the wings 12 and 14 during manufacture.

Since, as hereinbefore indicated, the right wing tip 18 is identical to the left wing tip 16, except for being a mirror image thereof, only the left wing tip 16 will be considered in detail herein. However, it will be understood that the description of the left wing tip 16 is equally applicable to the right one.

Considering the wing tip 16 in more detail now, the profile of its inboard end 26 substantially conforms, both dimensionally and configurationally, to the profile of the outboard end 20 of the wing 12, it being understood that the profile varies with the make and/or model of the airplane 10 involved.

More particularly, the wing tip 16 has upper and lower surfaces 28 and 30 and leading and trailing edges 32 and 34 which substantially coincide, at the inboard end 26 of the wing tip, with the upper and lower surfaces and the leading and trailing edges, respectively, of the wing 12 at its outboard end 20.

The wing tip 16 has a substantially straight outboard end 36 which diverges rearwardly, relative to its inboard end, from the leading edge 32 to the trailing edge 34, this being best shown in FIG. 2 of the drawings. The outboard end 36 of the wing tip 16 is also inclined downwardly, relative to its inboard end, from the leading edge 32 to the trailing edge 34, as best shown in FIG. 3.

As shown in FIGS. 4 and 5 of the drawings, when the wing tip 16 is viewed in cross section, it curves and converges generally outwardly and downwardly from its inboard end 26 to its outboard end 36. The degree of such outward and downward convergence progressively increases from the leading edge 32 to the trailing edge 34, and, generally speaking, the degree of outward and downward curvature does also.

The maximum span of the wing tip 16 of the invention, i.e., the maximum distance between its inboard and outboard ends 26 and 36, measured in the direction of the span of the wing 12, is small as compared to the chord length of the wing tip. This is best shown in FIG. 2 of the drawings. As also shown best in FIG. 2, the maximum span occurs at the trailing edge 34 of the wing tip 16, the span progressively decreasing from the trailing edge to the leading edge 32.

As shown in FIG. 5c, the upper surface 28 of the wing tip 16 may be provided with a relatively flat area 38 on which a wing-tip light, not shown, may be mounted. Except for the flat area 38 at station c, which flat area has been omitted from the other figures for convenience, the various portions of the wing tip 16 of the invention are smooth and streamlined to minimize parasitic drag.

The particular plan configuration, elevational configuration and cross sectional configurations shown in FIGS. 2, 3 and 5 of the drawings are for all Piper PA18, PA18A, PA20, PA22, PA25-150 and PA25-235 airplanes. In FIG. 5, each side of each square of the grid on which the cross sections a through o are superimposed represents two inches. The wing tip 16 is correctly proportioned in FIGS. 2 and 3, but is shown on a smaller scale than FIG. 5, which scale can be determined readily by comparing corresponding dimensions. In FIG. 5, cross section a through o are all drawn with reference to the same base line 40, which base line is also shown in FIG. 3 and coincides substantially with the lower surface of the wing 12 at its outboard end 20.

It will be understood that while FIGS. 2, 3, and 5 are dimensioned and proportioned for specific airplanes, such dimensions and proportions may be modified for other airplanes without departing from the invention.

When the wing tip 16, and the complementary wing tip 18, are installed on the airplane 10, they reduce the size of the usual wing-tip vortices, and direct such vortices downwardly. The effect is to improve significantly various characteristics of the airplane 10, including its performance, aerodynamic, and dusting or spraying characteristics. As hereinbefore discussed, substantial improvements in performance characteristics, including take off, landing, rate of climb and cruising speed, are achieved. Also, the airplane is more stable than with conventional wing tips, and is less susceptible to exhibiting false stall warnings, such as shuddering in turns. The latter is probably due to the fact that the wing-tip vortices, being smaller and being directed downwardly, lie entirely below the plane of the horizontal stabilizers and elevators, and thus cannot cause buffeting of any portion of the empennage.

In dusting or spraying with the airplane 10 equipped with the wing tips 16 and 18 of the invention, the smaller and downwardly directed wing tip vortices minimize laterally outward and upward spreading of the dust or spray. In other words, the dust or spray is discharged in a strip which has substantially parallel lateral boundaries and the upper boundary of which is substantially parallel with the ground. This is in contrast with a strip of dust or spray produced with a conventional airplane, wherein the lateral boundaries diverge rearwardly of the direction of flight of the airplane, and wherein the upper boundary may slope upwardly in the rearward direction.

The net result is that the airplane 10, equipped with the wing tips 16 and 18 of the invention, distributes the dust or spray in a very accurate and controlled manner, there being little opportunity for the discharged material to drift out of the area being treated. Consequently, the possibilities of air pollution, damage to adjacent properties, and the like, are minimized.

Although an exemplary embodiment of the invention has been disclosed herein for illustrative purposes, it will be understood that various changes, modifications and substitutions may be incorporated in such embodiment without departing from the spirit of the invention as defined by the claims which follow.

I claim as my invention:

1. An airfoil tip for use on the outboard end of an airfoil:

(a) said tip having an inboard end the profile of which substantially conforms to the profile of the outboard end of the airfoil on which it is to be mounted;

(b) said tip having an outboard end which diverges rearwardly, relative to its inboard end, from the leading edge of said tip to its trailing edge;

(c) said outboard end of said tip being inclined downwardly, relative to its inboard end, from the leading edge of said tip to its trailing edge;

(d) said outboard end of said tip, at the leading edge thereof, being located at substantially the same level as the lower surface of the inboard end of said tip, and said outboard end of said tip, at the trailing edge thereof, being located below said inboard end thereof a distance substantially equal to the maximum thickness of said inboard end of said tip;

(e) said tip curving and converging generally outwardly and downwardly from its inboard end to its outboard end, and the degree of such outward and downward convergence of said tip increasing progressively from the leading edge of said tip to its trailing edge; and (f) the maximum span of said tip, measured in the direction of the span of the airfoil on which said tip is to be mounted, being located at the trailing edge of said tip and being small as compared to the chord length of said tip.

2. An airfoil tip for use on the outboard end of an airfoil:

(a) said tip having an inboard end the profile of which substantially conforms to the profile of the outboard end of the airfoil on which it is to be mounted;

(b) said tip having a substantially straight outboard end which diverges rearwardly, relative to its inboard end, from the leading edge of said tip of its trailing edge;

(c) said outboard end of said tip being inclined downwardly, relative to its inboard end, from the leading edge of said tip to its trailing edge;

(d) said outboard end of said tip, at the leading edge thereof, being located at substantially the same level as the lower surface of the inboard end of said tip, and said outboard end of said tip, at the trailing edge thereof, being located below said inboard end thereof a distance substantially equal to the maximum thickness of said inboard end of said tip;

(e) said tip curving and converging generally outwardly and downwardly from its inboard end to its outboard end, and the general degree of such outward and downward curvature and convergence of said tip increasing progressively from the leading edge of said tip to its trailing edge; and (f) the maximum span of said tip, measured in the direction of the span of the airfoil on which said tip is to be mounted, being located at the trailing edge of said tip and being small as compared to the chord length of said tip.

References Cited

Jane's "All the World's Aircraft," 1960–61, p. 279.

Jacobshagen, N. "Check Pilot Report: Cessna 210." An article in the magazine Flying, vol. 65, No. 5, p. 36, November 1959.

Sweeney, Richard, "Cessna 210 Design Changes and Speed, Controllability": An article in the magazine Aviation Week, vol. No. 9, p. 102, August 31, 1959.

MILTON BUCHLER, *Primary Examiner.*

T. MAJOR, *Assistant Examiner.*